United States Patent [19]
Hsu

[11] Patent Number: 5,514,041
[45] Date of Patent: May 7, 1996

[54] ELECTRONIC BICYCLE DERAILLEUR CONTROL APPARATUS

[76] Inventor: Yi-Hsung Hsu, No. 21, Lane 61, Sec. 1, Kwangfu Rd., San Chung City, Taipei Hsien, Taiwan

[21] Appl. No.: 342,755

[22] Filed: Nov. 21, 1994

[51] Int. Cl.⁶ .................................................. F16H 61/00
[52] U.S. Cl. .................................... 474/78; 474/80
[58] Field of Search ................ 474/69, 70, 78–81

[56] References Cited

U.S. PATENT DOCUMENTS 4,605,240  8/1986  Clem et al. ........................ 474/86 X
5,059,158  10/1991 Bellio et al. ....................... 474/80 X
5,254,044  10/1993 Anderson .......................... 474/80 X
5,357,177  10/1994 Fey et al. ........................... 474/80 X Primary Examiner—Michael Powell Buiz
Attorney, Agent, or Firm—Kolisch, Hartwell, Dickinson, McCormick & Heuser

[57] ABSTRACT

A bicycle derailleur control apparatus includes at least one input device for setting a derailleur position of at least one derailleur, at least a transmission device connected to the derailleur via a cable, a control device electrically connected to the at least one input device and the at least one transmission device for activating the transmission device to pull or release the cable to a level in response to the setting from the input device thus changing the derailleur position.

5 Claims, 5 Drawing Sheets

ELECTRONIC BICYCLE DERAILLEUR CONTROL APPARATUS

BACKGROUND OF THE INVENTION

1. Field of the Invention

The present invention relates to an electronic bicycle derailleur control apparatus.

2. Description of the Prior Art

A conventional derailleur control apparatus is a total mechanism including a shifter installed on a downtube or a handlebar. This structure requires a considerable effort to change a derailleur of the bicycle. No matter whether the shifter of the derailleur control apparatus is installed on the downtube or the handlebar of the bicycle, a biker is apt to loose balance when he/she operates the shifter on a speeding bicycle thus causing an accident. It is requisite to provide an improved derailleur control apparatus which is easily operated and does not cause a loss of balance problem when the biker is operating it whilst riding a speeding bicycle.

SUMMARY OF THE INVENTION

The primary objective of the present invention is to provide an improved derailleur control apparatus of a bicycle allowing a biker to operate it in a very easy and simple manner.

In accordance with one aspect of the invention, there is provided a bicycle derailleur control apparatus comprising at least one input device for setting a derailleur position of at least one derailleur, at least one transmission device connected to the derailleur via a cable, a control device electrically connected to the at least one input device and the at least one transmission device for activating the transmission device to pull or release the cable to a level in response to the setting from the input device thus changing the derailleur position.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
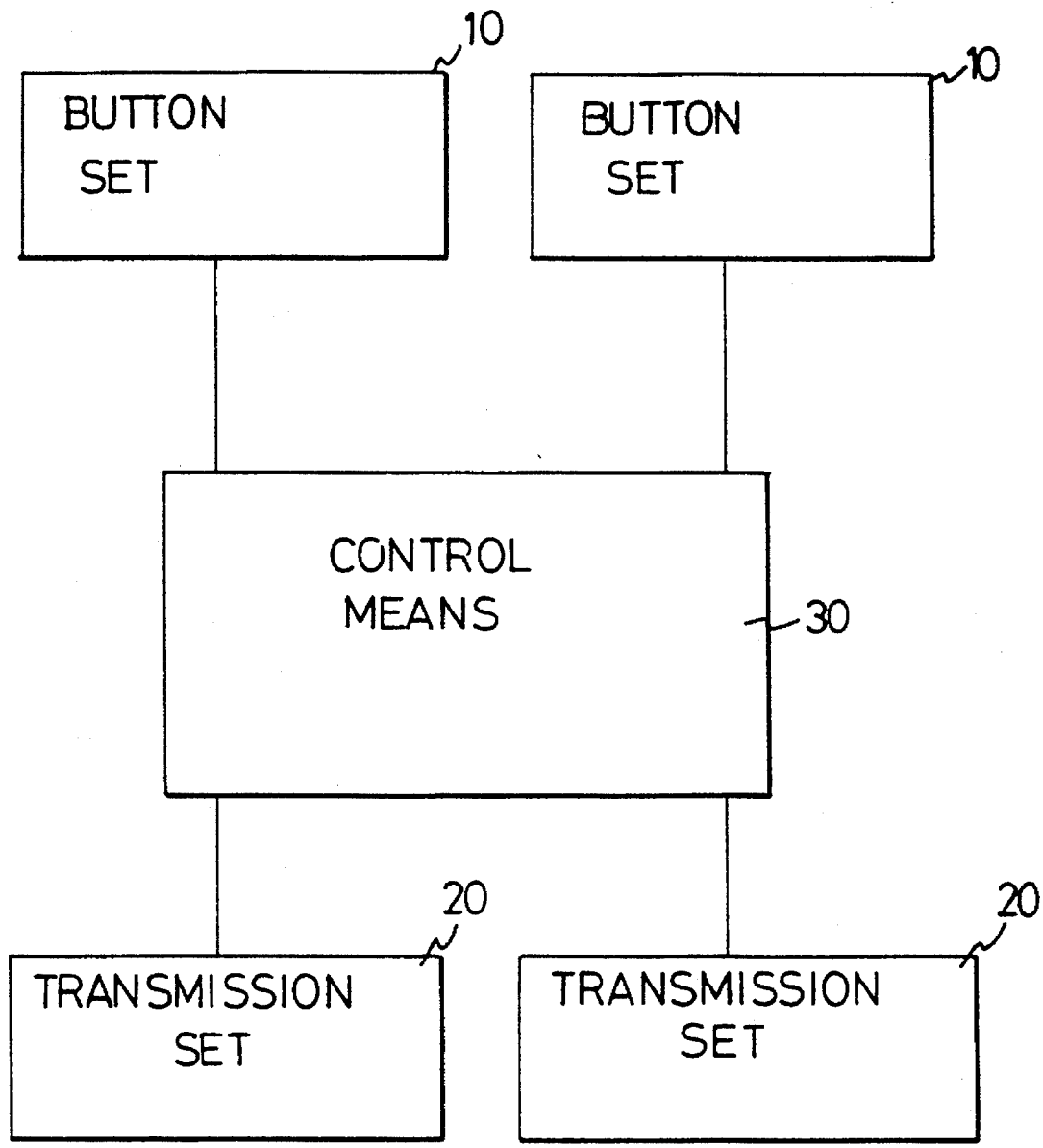
FIG. 1 is a block diagram of a derailleur control apparatus of a bicycle in accordance with the present invention.
Figure 2:
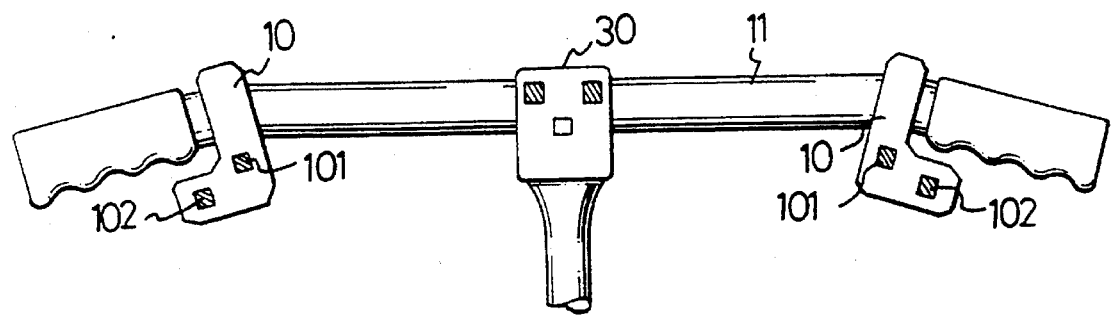
FIG. 2 illustrates a button set of the derailleur control apparatus of the present invention.

Referring to FIGS. 1 and 2, a bicycle derailleur control apparatus in accordance with the present invention comprises two button sets 10, two transmission sets 20, and a control circuit 30, where the two button sets 10 are installed on a handlebar 11 of a bicycle for easy handling by either of two hands of a user.

Figure 6:
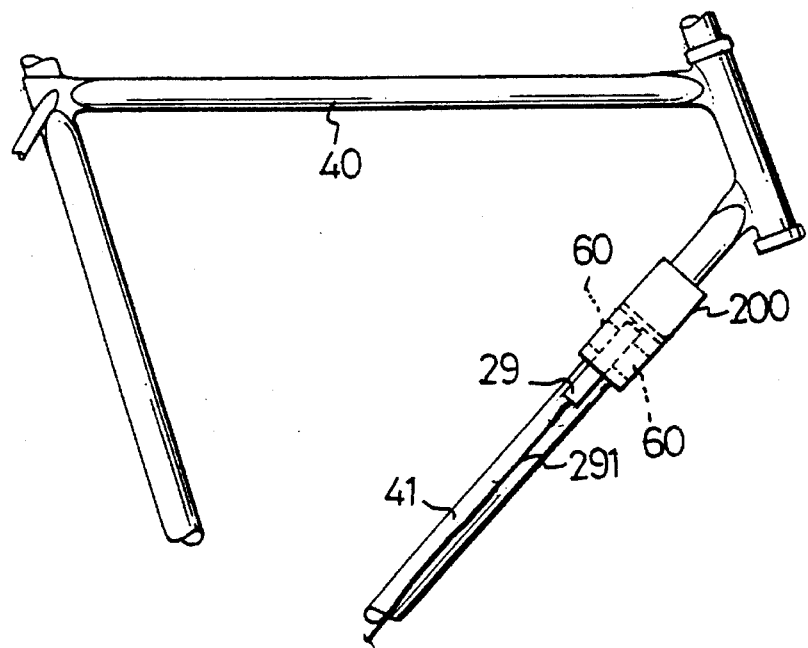
FIG. 6 is a schematic view illustrating how the transmission set is installed on a bicycle.
Figure 3:
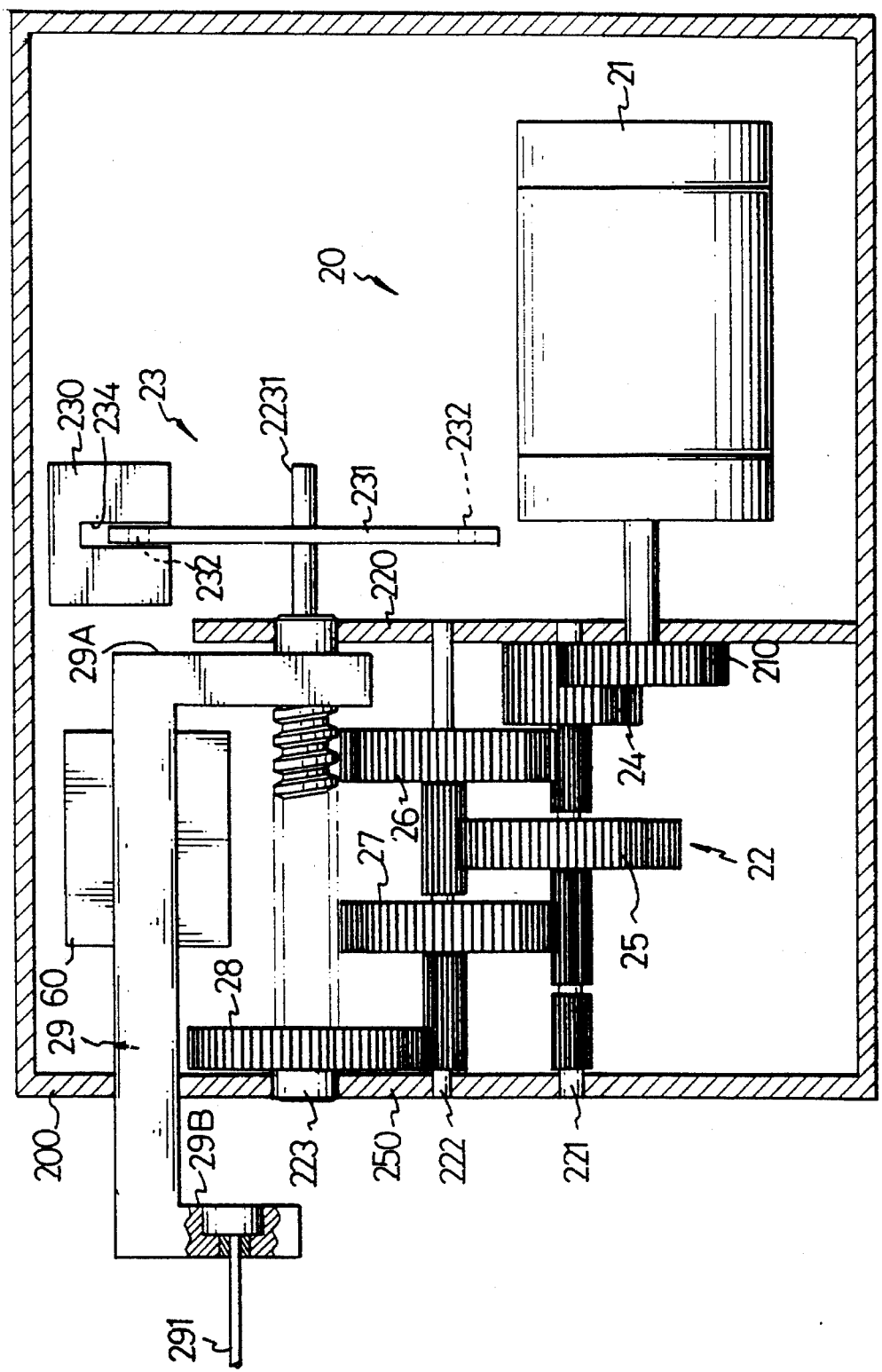
FIG. 3 illustrates a transmission set of the derailleur control apparatus of the present invention.

Referring to FIG. 3, the transmission set 20 comprises a motor 21 and a speed reducing gear set 22, and is installed in a box 200. The motor 21 includes a shaft 211 extended therefrom and connected to a gear 210 which is meshed with the gear set 22. The speed reducing gear set 22 comprises a positioning plate 220 attached to a base of the box 200 and spaced distant to a front wall 250 of the box 200. A first shaft 221 and a second shaft 222 are firmly retained between the front wall 250 and the positioning plate 220. A threaded rod 223 is rotatably placed between the front wall 250 and the positioning plate 220. A first compound gear 24 and a second compound gear 25 are rotatably yet not slidably retained around the first shaft 221. Similarly, a third compound gear 26 and a fourth compound gear 27 are rotatably yet not slidably retained around the second shaft 222. Each of the compound gears 24, 25, 26, and 27 is T-shaped in cross-sectional view. A U-shaped rod 29 has a first limb 29A, a second limb 29B, and a shank (not labeled) connected therebetween. The first limb 29A of the U-shaped rod 29 is threadedly connected to the threaded rod 223. The second limb 29B and a portion of the shank are extended out of the box 200. A derailleur cable 291 has one end firmly connected to the second limb 291 and a second end firmly connected to a conventional rear derailleur (not shown) for pulling or releasing the rear derailleur. Also referring to FIG. 6, two limiters 60 are attached to two opposite walls; of the box 200 preventing the U-shaped rod 29 from rotation when the threaded rod 223 is driven to rotate by the motor 21 via the speed reducing gear set 22. A rod portion 2231 extends from one end of the threaded rod 223. Two optical sensing devices 23 each comprise an optical grating disk 231 connected to the rod portion 2231 of the threaded rod 223, and an optical coupler 230 defining a slot 234 and fixed to an inner wall of the box 200 and allowing the optical grating disk 231 to rotate in the slot 234 thereof. The optical grating disk 231 defines a plurality of holes 232 uniformly distributed along a circumference thereof. It is well known that the optical coupler 230 includes a light source (not shown) and a photo-transistor oppositely facing to each other through the slot 234. The optical coupler 230 generates pulse signals when the optical grating disk 231 rotates.

Figure 4:
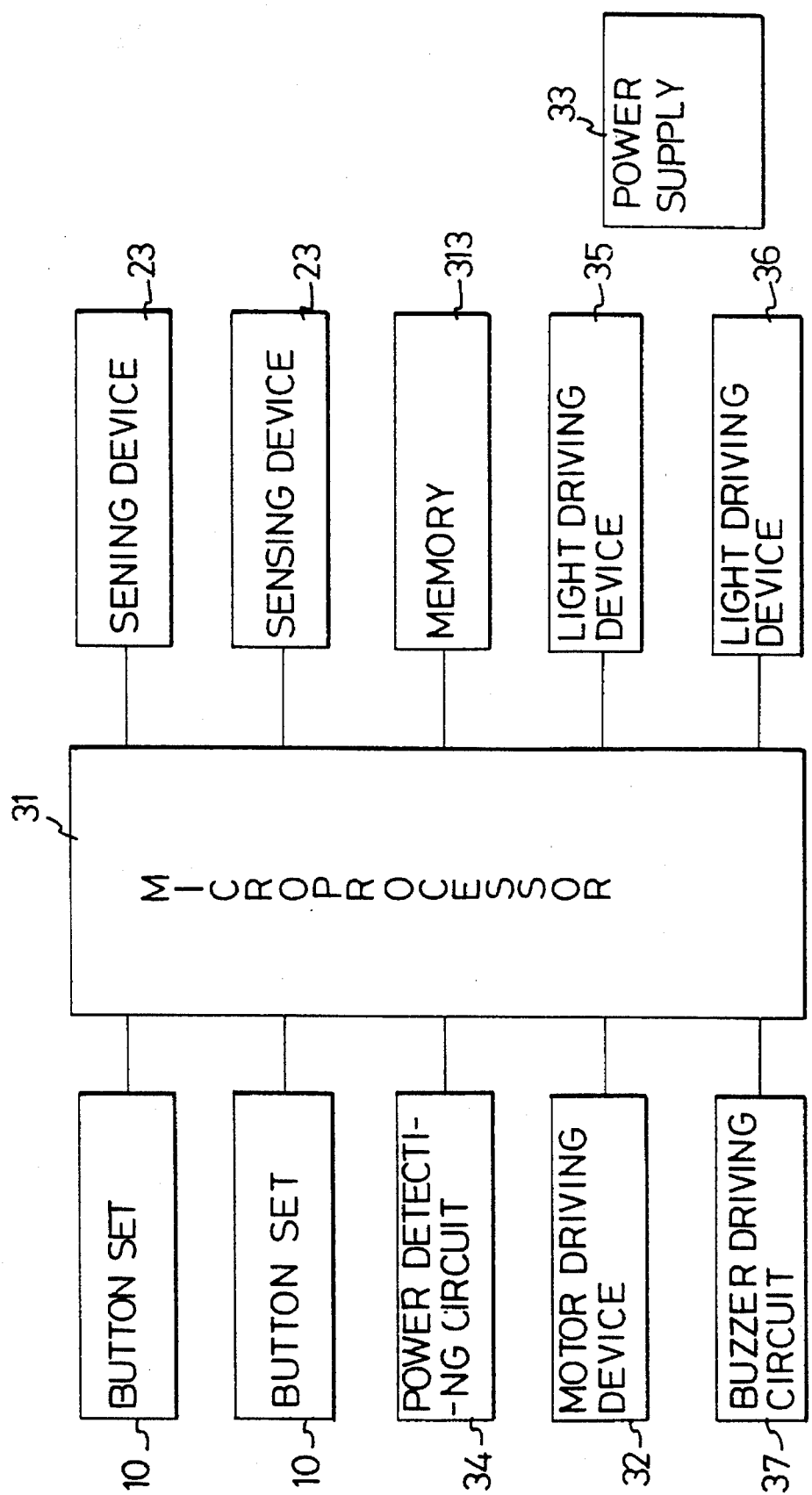
FIG. 4 is a block diagram used in the derailleur control apparatus of the present invention.

Referring to FIG. 4, the control circuit 30 comprises a DC power supply 33 and a microprocessor 31 electrically connected to the two button sets 10, the two sensing devices 23, a motor driving circuit 32, a power detecting circuit 34, a memory 313, two light driving devices 35 and 36, and a buzzer driving device 37. Each button set 10 comprises an "UP" button 101 and a "DOWN" button 102 for respectively changing the derailleur position in "increased" and "decreased" directions. Herein, the "increased" direction represents the derailleur position is changed from a lower toothed sprocket to a higher toothed sprocket, while the "decreased" direction represents as contrary to the "increased". The microprocessor 31 is programmed such that when the user operates either of the button sets 10, the motor driving device 32 will drive one of the motors 21 in a direction according to the operation on the operated button set 10. The memory 313 stores regulations for the motor 21 with respect to different derailleur positions. The electronic bicycle derailleur control apparatus of the present utility model may be used in different kinds of derailleurs. However, different kinds of derailleurs require the motor 21 to rotate different cycles for moving the chain from one derailleur position to another derailleur position. To obtain the regulation of one button set 10 with respect to the rear derailleur and store the regulation in the memory 313, the user firstly depresses both the "UP" button 101 and "DOWN" button 102 of the button set 10 for about two seconds, thereafter the user releases the "DOWN" button 102 and depresses the "UP" button 101, meanwhile the U-shaped rod 29 of the transmission set 20 is driven by the speed reducing gear set 22. The user again depresses both "UP" and "DOWN" buttons when the chain is placed on a new derailleur position. The above procedure is repeated until the chain has been placed on all derailleur positions of the rear derailleur. It is similarly possible to obtain the front derailleur regulation regarding to another button set with respect to the front derailleur.

The photo coupler 230 of the sensing device 23 sends back pulse signals to the microprocessor 31 in response to transmission of the speed reducing gear set 22. Therefore the microprocessor 31 receives a derailleur position changing command from the button set 10, forcing the motor 21 to rotate predetermined turns in a corresponding direction via the motor driving device 32 according to the derailleur position changing command, receiving pulse signals from the sensing device 23, and stopping the motor 21 when the sent back pulse number reaches a predetermined number according with the derailleur position changing command. The power detecting circuit 34 detects power insufficiency and informs the microprocessor 31, which in turn activates the two light driving devices 35 and 36 to drive corresponding lights to emit light for informing the user to change batteries. The microprocessor 31 detects a malfunction on the transmission set 20 if a new derailleur position has not been achieved after a button of the button sets 10 has been depressed over a predetermined time. In this situation, the microprocessor 31 activates the buzzer driving circuit 37 and causes a buzzer (not shown) to alarm. The user is informed the malfunction of the transmission set 20 by the alarm from the buzzer.

Figure 5:
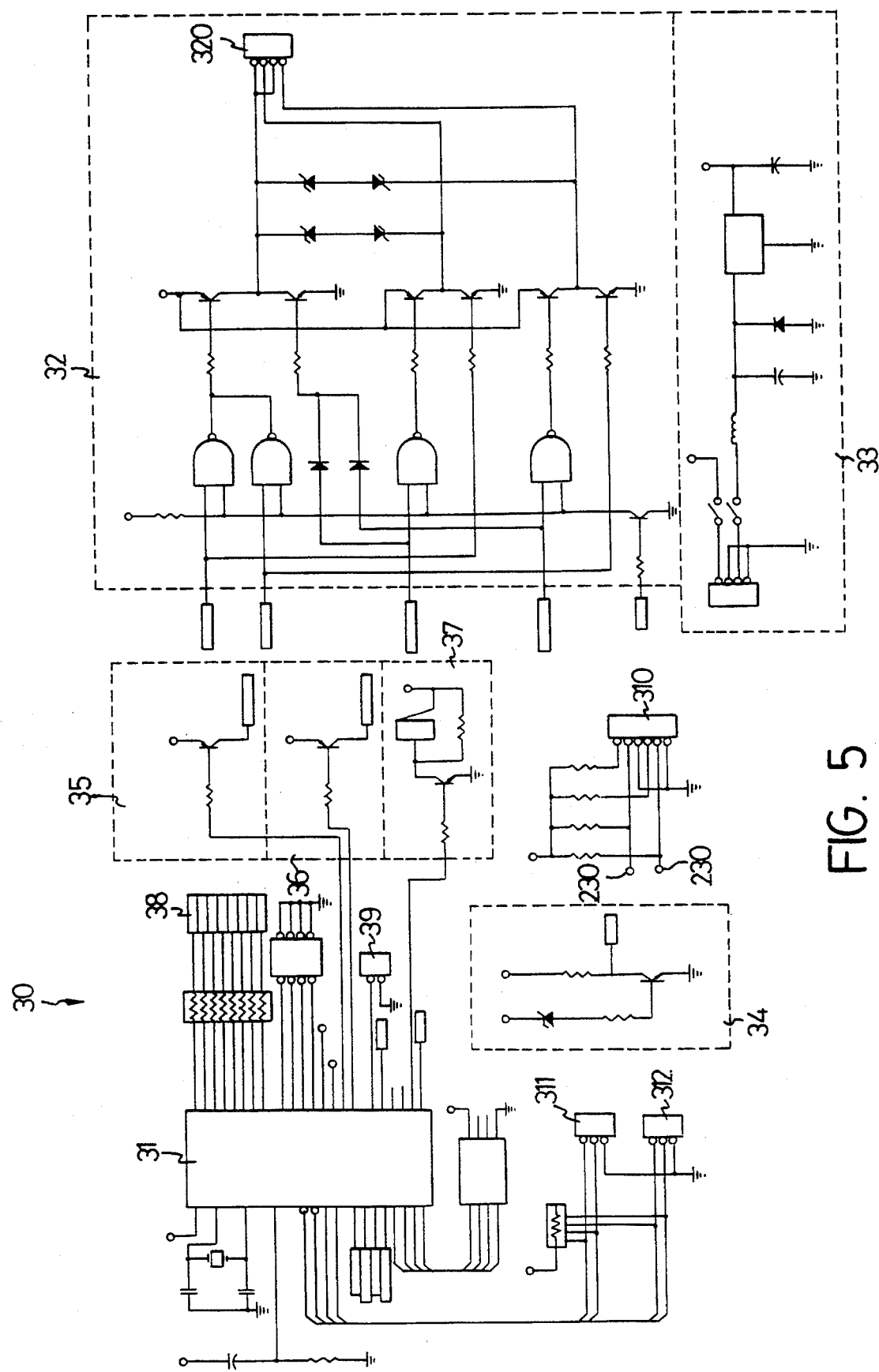
FIG. 5 is a circuit diagram used in the derailleur control apparatus of the present invention.

A detailed circuit diagram, of FIG. 4 is illustrated in FIG. 5. Two connectors 311 and 312 are connected between the button sets 10 and the microprocessor 31. A connector 310 is connected between the two sensing devices 23 and the microprocessor 31. A connector 320 is connected between the motor driving devices 32 and the two motors 21. For simplification, the very detail of the circuit diagram in FIG. 5 is not described since it is well known to those skilled in this field.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I CLAIM:

1. A bicycle derailleur control apparatus comprising
   at least one input means for setting a derailleur position of at least one derailleur;
   at least one transmission means connected to said derailleur via a cable;
   a control means electrically connected to said at least input means and said at least transmission means for activating said transmission means to pull or release said cable to a level in response to the setting from said input means thus changing said derailleur position;
   wherein said transmissions means comprises a motor which is electrically connected to said control means for rotating to predetermined turns in response to a setting from said input means, a speed reducing gear set connected to said motor, a motion converting means connected to said speed reducing gear set for converting a rotation of said speed reducing gear set to a linear movement, said cable which is connected to said derailleur being connected to said motion converting means for pulling or releasing said cable to a level in response to the linear movement of said converting means.

2. A bicycle derailleur control apparatus as claimed in claim 1, wherein said input means includes a first button and a second button being depressible for respectively setting the derailleur position in an increased direction and a decreased direction.

3. A bicycle derailleur control apparatus as claimed in claim 1, wherein said motion converting means of said transmission means comprises a threaded rod being positioned in place and being rotatable by a drive from said speed reducing gear set, and a U-shaped rod including a first limb having a threaded hole for receiving a portion of said threaded rod, a second limb connected to said cable, and a shank connected between said first limb and said second limb, said U-shaped rod being prevented from rotation yet allowed to move along said threaded rod when said threaded rod rotates.

4. A bicycle derailleur control apparatus as claimed in claim 1, wherein said control means comprises a preprogrammed microprocessor for sending a command representing predetermined turns for said motor to rotate in response to the setting of said input means, at least a sensing device connected between said transmission means and said microprocessor for sending back pulse signals to the microprocessor in response to transmission of the speed reducing gear set, a motor driving device connected between the microprocessor and the motor for driving the motor to rotate in response to the command from the microprocessor, wherein said microprocessor deactivates said motor driving device when an amount of said received pulse signals accords with the command from the microprocessor.

5. A bicycle derailleur control apparatus as claimed in claim 4, wherein said sensing means comprises an optical grating disk connected to the speed reducing gear set and is driven to rotate thereby, and an optical coupler for detecting rotated turns of said optical grating disk and outputting corresponding pulse signals therefrom.

* * * * *